Dec. 17, 1935.  J. F. RUSSELL  2,024,255
PROCESS FOR THE STERILIZATION OF MILK AND OTHER LIQUIDS
Filed July 31, 1930  2 Sheets-Sheet 1
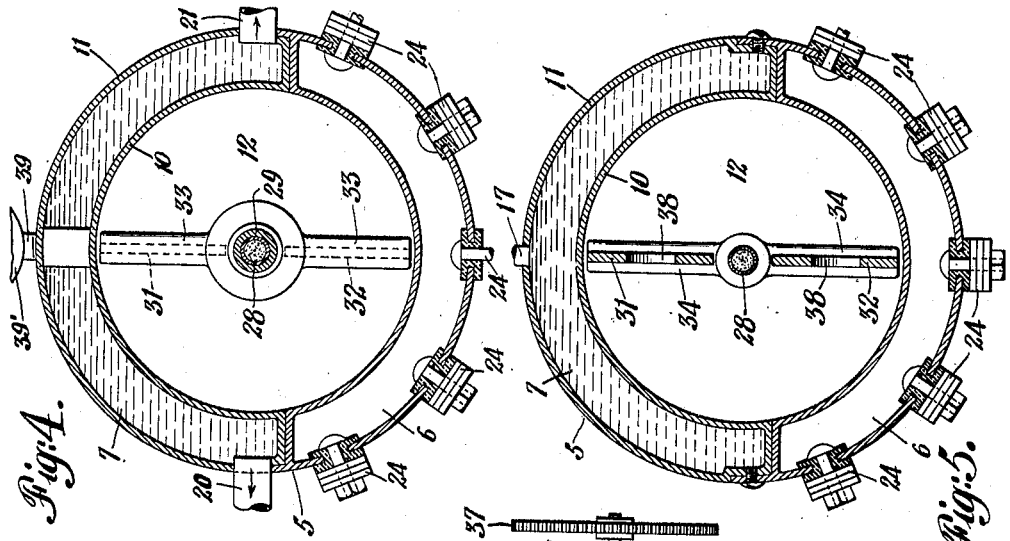
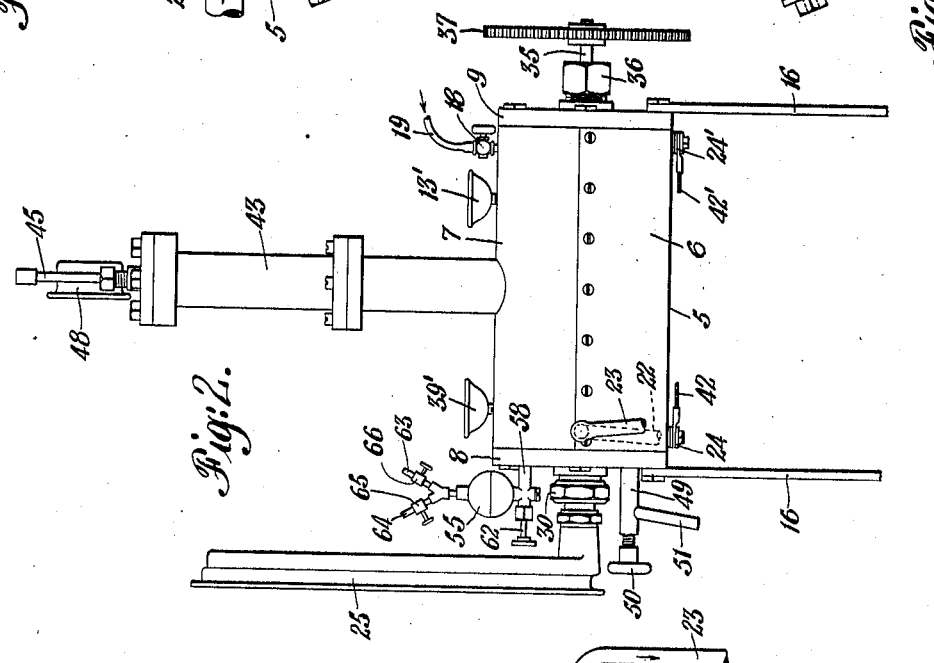
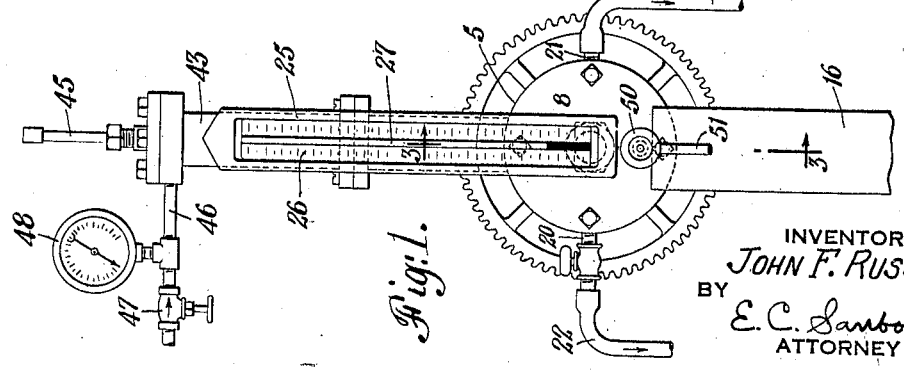
INVENTOR
JOHN F. RUSSELL
BY
E. C. Sanborn
ATTORNEY Dec. 17, 1935.  J. F. RUSSELL  2,024,255
PROCESS FOR THE STERILIZATION OF MILK AND OTHER LIQUIDS
Filed July 31, 1930  2 Sheets-Sheet 2
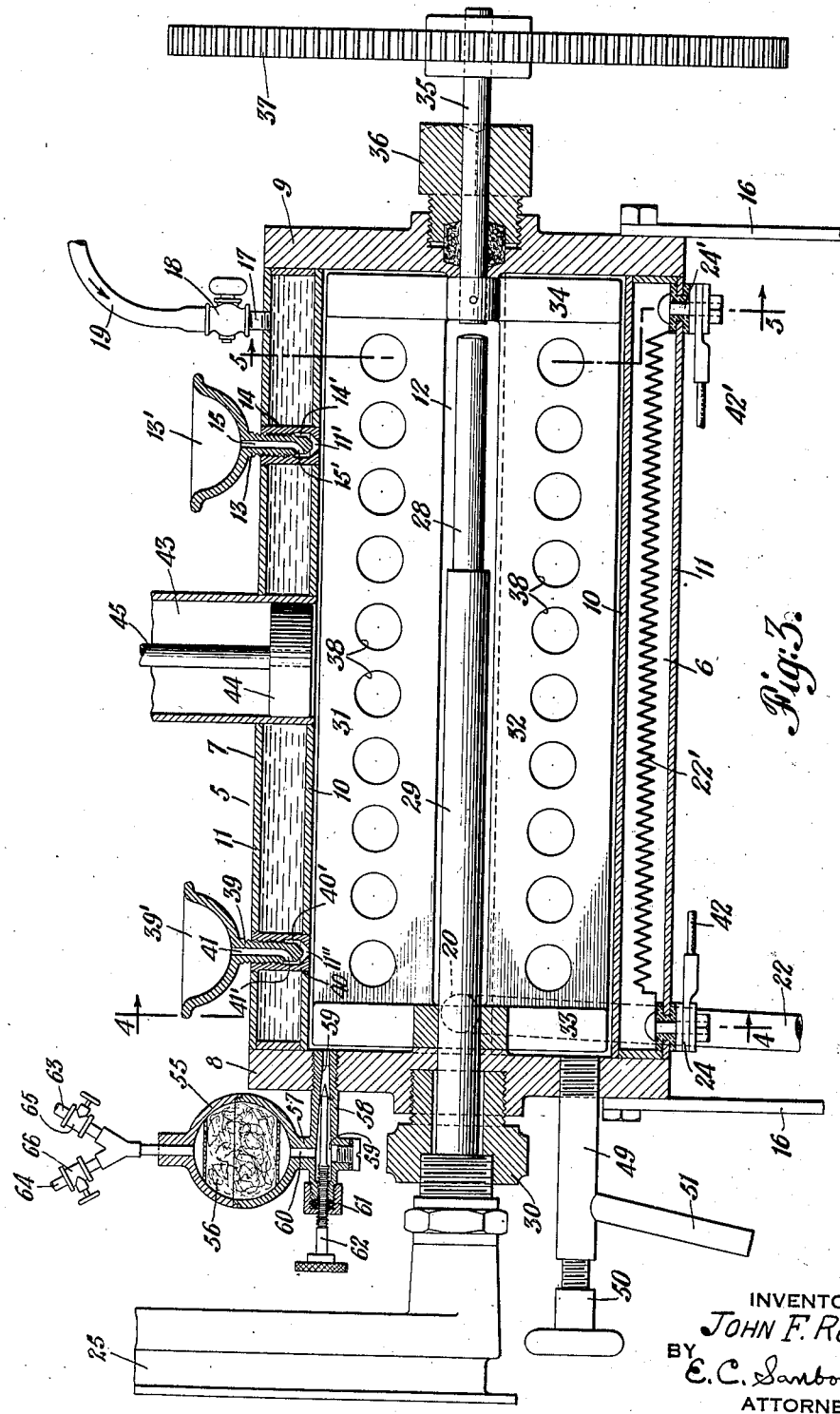
INVENTOR
JOHN F. RUSSELL
BY
E. C. Sanborn
ATTORNEY Patented Dec. 17, 1935

2,024,255

UNITED STATES PATENT OFFICE 2,024,255

PROCESS FOR THE STERILIZATION OF MILK AND OTHER LIQUIDS

John F. Russell, New York, N. Y.

Application July 31, 1930, Serial No. 471,915

4 Claims. (Cl. 99—8)

This invention is concerned with the sterilization of milk and other liquids. Sterilization requires a temperature of 230° F. which, of course, is above the boiling point. Heretofore, so far as I am aware, no method has been devised for the sterilization of milk without substantially impairing the natural taste thereof. On the other hand, with processes such as pasteurization, wherein the natural taste is retained, the milk is heated below the boiling point, with resultant failure to destroy the spores of the bacteria, as well as certain types of bacteria themselves. Through my invention, not only are all bacteria and spores destroyed but the natural flavor of the milk is preserved. In carrying out my invention I subject the milk or other liquid to the sterilizing temperature while at the same time maintaining it under pressure and out of contact with the air. The pressure applied is sufficient to prevent boiling, and the exclusion of air prevents the imparting of a cooked taste and enables the natural flavor to be retained. The exclusion of air also avoids the discoloration or brownish color which results from cooking of milk. In addition, I find it desirable to agitate the liquid during the sterilizing process. I shall describe herein an embodiment illustrative of my invention and shall point out the novel features of the invention in claims.

In the accompanying drawings:

Fig. 1 is a view in end elevation of an apparatus which may be employed for carrying out my sterilizing process.

Fig. 2 is a side elevation thereof.

Fig. 3 is a longitudinal vertical section, on an enlarged scale, taken on line 3—3 of Fig. 1.

Figs. 4 and 5 are transverse vertical sections, taken on lines 4—4 and 5—5, respectively, of Fig. 3.

Referring to the drawings there is shown at 5 a casing or container for the milk or other liquid to be treated. This casing may conveniently consist of juxtaposed segmental sections 6, 7, secured together in any suitable way as by bolts or rivets, and bolted or otherwise fastened to end members 8, 9. The sections 6, 7, as shown, have both inner and outer walls 10, 11, the section 6 forming a compartment for a heating unit and the section 7 a compartment for a cooling medium. The space 12 bounded by the inner walls of said sections receives the liquid to be sterilized. Liquid may be introduced into the space 12 in any suitable or convenient way. For example a stem 13 having a funnel 13' at the upper end thereof may, as shown, be threadedly engaged with the interior of a member 14 provided with a chamber 14' and mounted in walls 10 and 11 of section 7. As shown, the chamber 14 communicates with the space 12 through an opening 11' in wall 10. The stem 13 has a passageway 15 communicating at its upper end with the funnel 13' and having a lateral branch 15' at its lower end extending into communication with chamber 14'. The lower end of stem 13 is shaped to close the opening 11', and thus to cut off communication between chamber 14' and space 12, when the funnel 13' and stem. 13 are turned sufficiently. In the position shown in Fig. 3, the stem is withdrawn from opening 11', and milk or other liquid may be readily introduced into space 12 by simply pouring the liquid through the funnel 13'. When space 12 has been filled the funnel 13' may be rotated in the proper direction and thereby, through the threaded engagement between stem 13 and member 14, said stem may be engaged with opening 11' to close the latter. The casing 5 may be supported on suitable standards 16.

For the circulation of a cooling medium through the section 7, an inlet pipe 17, provided with a valve 18, communicates with the interior of said section and is connected to a hose 19; while outlet pipes 20, 21, connected to hose lines 22, 23, also communicate with the interior of said section. The hose lines may be connected to a suitable source whereby water or other cooling medium is forced into section 7 through hose 19 and pipe 17, and thence returns to said source through pipes 20 and 21 and attached hose lines. The heating unit may consist of resistance elements 22', each connected between a respective pair of terminals 24, 24' supplied with electric current from any suitable source through wires 42 and 42'.

A thermometer 25 is provided for indicating the temperature of the liquid in the space 12 of receptacle 5. Said thermometer is shown as comprising a vertical portion provided with a scale 26 and with a horizontal portion extending into the space 12 of said receptacle. The glass tube of the thermometer comprises a vertical portion 27 and a horizontal portion 28, said horizontal portion extending along the longitudinal axis of the receptacle 5 and being surrounded throughout a substantial portion of its length by a housing 29. The thermometer may be conveniently mounted in a bearing element 30 on the end member 8 as shown.

I also mount within the receptacle 5 an agitator, which, as shown, may comprise a pair of blades 31, 32, united at their ends by yokes 33, 34. The yoke 33 surrounds and is rotatably supported on the housing 29, while the yoke 34 is secured to a shaft 35 journaled in end member 9 and in bearing element 36 carried thereby. Shaft 35 may be rotated in any suitable way, as for example through a motor (not shown) suitably connected to gear wheel 37 on said shaft. The agitator blades 31, 32 may be provided with apertures 38 to permit the liquid to flow therethrough.

For providing for the escape of air from the casing 5 during the filling of the latter with liquid, any convenient means may be employed, such, for example, as the following. Near one end of the casing 5 a stem 39 similar to stem 13 is threadedly engaged with the interior of a member 40, mounted in the walls 10 and 11 of the section 7 and provided with a chamber 40'. Said chamber 40' communicates through opening 11" of wall 10 with the interior 12 of casing 5. The upper end of stem 39 carries a funnel or bowl 39', which is in communication with an interior passage 41 in said stem. A lateral branch 41' of said passage 41 communicates with chamber 40'. When stem 39 is in the position shown in Fig. 3, the interior space 12 of casing 5 is in communication with the atmosphere through opening 11", passage 41, and bowl 39', and thus air may escape from said space 12 as the latter is being filled with liquid from funnel 13'. The appearance of liquid in bowl 39' shows that the space 12 has been filled and the operator may thereupon turn bowl 39' and stem 39 in the proper direction, whereby through the threaded engagement between stem 39 and member 40 said stem is moved to close the opening 11".

Extending upwardly from the casing 5 and communicating with the interior thereof is a piston chamber 43 within which is a piston 44. A stem 45 of said piston projects through an end wall of said chamber 43 and assists in guiding said piston. A pipe 46 connected to a suitable source of air or other fluid pressure communicates with the chamber 43 and is provided with a valve 47 for controlling the admission or cutting off of pressure from said chamber. The pressure within the chamber is indicated by a gauge 48.

For withdrawing liquid from the interior of the casing 5 a pipe 49 having a valve 50 is provided. An extension 51 of said pipe may lead to apparatus of well known type for bottling the liquid.

In the carrying out of my process, referring specifically to the sterilization of milk, the casing 5 is filled with the milk to be sterilized, said milk being introduced into the interior 12 of said casing through the funnel 13' and stem 13. During this time the stem 39 has been positioned to permit the escape of air from said casing. The piston 44 is preferably in such position in the chamber 43 that when the casing 5 is filled the milk contacts with the bottom of said piston. After the casing 5 is filled the stems 13 and 39 are turned to close the respective openings 11', 11", and the valve 47 is opened to supply to the piston 44 air pressure sufficient to prevent boiling of the milk when subjected to the sterilizing heat. Preferably, the air pressure supplied to the piston is sufficient not only to prevent boiling of the milk but also to prevent evaporation below its normal boiling point, (i. e., its boiling point at atmospheric pressure). An electric circuit is then established through the heating elements 22. Also, the agitator 31, 32 is set in operation. The milk is subjected for fifteen minutes or longer to a temperature sufficient to insure sterilization. The agitator causes uniform distribution of the heat throughout the milk and also prevents cream from collecting at the top thereof. The rate of agitation need simply be sufficient to accomplish the results above outlined.

After the sterilization has been completed, the current through the heating units 22 is cut off, and a cooling liquid, which has been cut off from the section 7 during the heating process, is passed through said section. The pressure on the piston 44 is maintained until the temperature of the milk is below the boiling point; and, to insure avoiding of any possible evaporation said pressure may be maintained until the temperature is lowered to around 60° F. Preferably, the agitator is continued in operation during the cooling of the milk to provide for uniformity in the cooling thereof.

After the sterilizing and cooling operations have been completed, the milk is withdrawn through the pipes 49 and 51 and is transmitted to any suitable or convenient mechanism for bottling the milk under sterilized conditions.

Any suitable provision may be made for admitting air to the casing 5 to facilitate the withdrawal of the milk therefrom. I have provided for the admission of such air through sterilized material such as sterilized cotton. For this purpose I have shown a container 55 comprising a pair of hollow hemispherical members in screw-threaded engagement with each other or otherwise detachably secured together, in which container there is positioned sterilized cotton 56. A hollow boss 57 depending from said container has mounted thereon a stem 58 which is screw-threaded into one end of casing 5. Said stem 58 has a tapered interior passage 59 and an aperture 60 communicating with the interior of container 55. A cap 61 secured to said stem 58 has screw threaded engagement with a stem or needle valve 62. At its upper end the container 55 communicates, as shown, with a pipe 63 open to the atmosphere and with a pipe 64 leading to a source of steam. A valve 65 of any suitable or conventional construction controls communication between pipe 63 and the atmosphere and a similar valve 66 controls communication between pipe 64 and the steam source.

Prior to introducing liquid to be sterilized into the interior of the casing 5, steam may be passed through the cotton 56 to sterilize the latter. To accomplish this, the valve 65 is closed and valve 66 opened. The needle valve 62 is adjusted at the same time to afford communication through passage 59 with the interior of casing 5, and by opening the valve 50 the steam can pass out from said casing to the bottling chamber, thus sterilizing the latter. Both the cotton 56 and the bottling chamber may thus be sterilized simultaneously. When the milk is being introduced into the chamber 5 the valves 50, 62, and 66, as well as valve 65, are, of course, in closed position; while when said milk is being withdrawn from said casing the valves 50, 62, and 65 are open, and the air entering the chamber 5 is sterilized by passing through the cotton 56.

In the process as above described no mention has been made of withdrawing from the milk itself any air which may be present therein. Such air can, if desired, be removed through a vacuum pump connected to the interior of casing 5, but I find that the presence of such air does not impair the taste of the sterilized milk, and said air may be permitted to remain without objectionable results.

By the term "milk" as used herein, I intend of course to include cream. Furthermore, while my invention has been described particularly in connection with the sterilization of milk it will be apparent that the invention is not limited to any particular material and that instead it may be employed for the sterilization of a wide variety of substances.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of sterilizing a liquid comprising heating thereof to a temperature above its boiling point at atmospheric pressure for sufficient time to sterilize it, meantime confining said liquid in a closed chamber, applying pressure to said liquid from an external source through an element movable with respect to said chamber and continuing said pressure during heating of the liquid to prevent evaporation, meanwhile maintaining the liquid out of contact with air.

2. A method of sterilizing a liquid comprising heating thereof to a temperature above its boiling point at atmospheric pressure for sufficient time to sterilize it, meantime confining said liquid in a closed chamber, applying pressure to said liquid from an external source through an element movable with respect to said chamber and continuing said pressure during heating of the liquid to prevent evaporation, meanwhile maintaining the liquid out of contact with air, cooling the liquid and continuing the application of pressure to the liquid until the latter has cooled to at least about 80° F.

3. A method of sterilizing a liquid comprising heating thereof to a temperature above its boiling point at atmospheric pressure for sufficient time to sterilize it, meantime confining said liquid in a closed chamber, applying pressure to said liquid from an external source through an element movable with respect to said chamber and in contact with said liquid, and continuing said pressure during heating of the liquid to prevent evaporation, meanwhile maintaining the liquid out of contact with air.

4. A method of sterilizing a liquid comprising heating thereof to a temperature above its boiling point at atmospheric pressure for sufficient time to sterilize it, meantime confining said liquid in a closed chamber, applying pressure to said liquid from an external source through an element movable with respect to said chamber and in contact with said liquid, and continuing said pressure during heating of the liquid to prevent evaporation, meanwhile maintaining the liquid out of contact with air, cooling the liquid and continuing the application of pressure to the liquid until the latter has cooled to at least about 80° F.

JOHN F. RUSSELL.